US012670364B2

(12) United States Patent
Li et al.

(10) Patent No.: US 12,670,364 B2
(45) Date of Patent: Jun. 30, 2026

(54) TRAINING AND PREDICTION OF HYBRID GRAPH NEURAL NETWORK MODEL

(71) Applicant: Ant Zhixin (Hangzhou) Information Technology Co., Ltd., Hangzhou (CN)

(72) Inventors: Houyi Li, Hangzhou (CN); Guowei Zhang, Hangzhou (CN); Xintan Zeng, Hangzhou (CN); Yongyong Li, Hangzhou (CN); Yongchao Liu, Hangzhou (CN); Bin Huang, Hangzhou (CN); Changhua He, Hangzhou (CN)

(73) Assignee: Ant Zhixin (Hangzhou) Information Technology Co., Ltd., Hangzhou (CN)

( * ) Notice: Subject to any disclaimer, the term of this patent is extended or adjusted under 35 U.S.C. 154(b) by 547 days.

(21) Appl. No.: 18/272,194

(22) PCT Filed: Jan. 12, 2022

(86) PCT No.: PCT/CN2022/071577
§ 371 (c)(1),
(2) Date: Jul. 13, 2023

(87) PCT Pub. No.: WO2022/152161
PCT Pub. Date: Jul. 21, 2022

(65) Prior Publication Data
US 2024/0152732 A1 May 9, 2024

(30) Foreign Application Priority Data

Jan. 14, 2021 (CN) .......................... 202110050410.7

(51) Int. Cl.
*G06N 3/0455* (2023.01)
(52) U.S. Cl.
CPC .................................. *G06N 3/0455* (2023.01)
(58) Field of Classification Search
CPC .................................................. G06N 3/0455
(Continued)

(56) References Cited

U.S. PATENT DOCUMENTS 10,262,973 B1 * 4/2019 Hoyer .................... H10W 90/00
10,643,926 B2 * 5/2020 Choi .................... H10W 20/023
(Continued)

FOREIGN PATENT DOCUMENTS

| CN | 110598842 A | 12/2019 |
| CN | 111985622 A | 11/2020 |
| CN | 112381216 A | 2/2021 |

OTHER PUBLICATIONS

International Search Report and Written Opinion of Application No. PCT/US2022/071577, mailed Mar. 25, 2022, 9 pages.

*Primary Examiner* — Amare F Tabor
(74) *Attorney, Agent, or Firm* — Womble Bond Dickinson (US) LLP

(57) ABSTRACT

This specification provides a training method of a hybrid graph neural network model. The hybrid graph neural network model includes an encoding function and a decoding function. The method includes the following: using instances corresponding to all targets in training samples and several nearest neighbors of the instances as nodes in a graph, a graph representation vector of each instance is generated by using the encoding function based on graph data of all the instances. t rounds of training are performed on a decoding parameter; and in each round, bs targets are extracted from training samples, a predicted quantity of each target is generated by using the decoding function based on the graph representation vector of the instance corresponding to each target and non-graph data corresponding to each target, and the decoding parameter is optimized based on a loss quantity of the current round that is determined by the predicted quantities and label quantities of the bs targets in the current round. An encoding parameter is optimized based on loss quantities of the t rounds. All the preceding steps are repeated until a predetermined training termination condition is satisfied.

15 Claims, 3 Drawing Sheets

(58) Field of Classification Search
USPC ........................................................ 706/15
See application file for complete search history.

(56)                       References Cited

U.S. PATENT DOCUMENTS

| | | | |
|---|---|---|---|
| 11,392,513 B2 * | 7/2022 | Chawla | ............... G06F 16/9024 |
| 11,481,418 B2 * | 10/2022 | Wu | ......................... G06N 3/044 |
| 11,586,915 B2 * | 2/2023 | Macready | ............ G06N 3/0455 |
| 2016/0239461 A1 | 8/2016 | Kavipurapu | |
| 2021/0358577 A1 * | 11/2021 | Zhang | ................. G06N 3/0499 |

* cited by examiner

TRAINING AND PREDICTION OF HYBRID GRAPH NEURAL NETWORK MODEL

TECHNICAL FIELD

This specification relates to the field of data processing technologies, and in particular, to methods and apparatuses for training a hybrid graph neural network, and methods and apparatuses for prediction using a hybrid graph neural network.

BACKGROUND

Graphs have a powerful expression capability and can be used as data structures to model social networks running in various fields. A graph is usually used to describe a specific relationship between objects. Nodes are used to represent objects, whereas a line connecting two nodes is used to represent that two corresponding objects have such a relationship. A graph neural network (GNN, Graph Neural Networks) is a deep learning-based algorithm that runs in a graph domain. The GNN features convincing performance and high interpretability, and has become a widely applied graph analysis method.

In many application scenarios, input data of machine learning tasks, for example, a series of data with a time sequence relationship, is unsuitable to be represented as information in the graph domain. A hybrid graph neural network model combines the graph neural network algorithm with another machine learning algorithm, and can greatly improve a prediction effect in these application scenarios.

When the hybrid graph neural network model is trained by using samples of a node, or the hybrid graph neural network model is used to perform prediction for a node, a k-nearest (k is a natural number) neighbor of the node needs to be calculated. A common method is to extract and calculate a k-nearest neighbor of each node each time. Because the k-nearest neighbors of the nodes often include same nodes, a large amount of redundant repetitive operation is caused, and training or prediction efficiency is affected.

SUMMARY

In view of this, this specification provides a training method of a hybrid graph neural network model. The hybrid graph neural network model includes an encoding function and a decoding function. The encoding function is a graph neural network algorithm with an encoding parameter and a combination thereof. The decoding function is a machine learning algorithm with a decoding parameter and a combination thereof. The method includes the following: By using instances corresponding to all targets in training samples and several nearest neighbors of the instances as nodes in a graph, a graph representation vector of each instance is generated by using the encoding function based on graph data of all the instances. t rounds of training are performed on the decoding parameter; and in each round, bs targets are extracted from training samples, a predicted quantity of each target is generated by using the decoding function based on the graph representation vector of the instance corresponding to each target and non-graph data corresponding to each target, and the decoding parameter is optimized based on a loss quantity of the current round that is determined by the predicted quantities and label quantities of the bs targets in the current round, where bs is a natural number, and t is a natural number greater than 1. The encoding parameter is optimized based on loss quantities of the t rounds. All the preceding steps are repeated until a predetermined training termination condition is satisfied.

This specification provides a prediction method of a hybrid graph neural network model. The hybrid graph neural network model includes an encoding function and a decoding function. The encoding function is a graph neural network algorithm with an encoding parameter obtained after training by using the previously described training method of a hybrid graph neural network model. The decoding function is a machine learning algorithm with a decoding parameter obtained after training by using the previously described training method of a hybrid graph neural network model. The method includes the following: By using instances corresponding to all to-be-predicted targets and several nearest neighbors of the instances as nodes in a graph, a graph representation vector of each instance is generated by using the encoding function based on graph data of all the instances. Predicted quantities of the targets are generated by using the decoding function based on the graph representation vectors of the instances corresponding to the to-be-predicted targets and non-graph data corresponding to the to-be-predicted targets.

This specification further provides a training apparatus of a hybrid graph neural network model. The hybrid graph neural network model includes an encoding function and a decoding function. The encoding function is a graph neural network algorithm with an encoding parameter and a combination thereof. The decoding function is a machine learning algorithm with a decoding parameter and a combination thereof. The apparatus includes the following: a training graph representation vector unit, configured to generate, by using instances corresponding to all targets in training samples and several nearest neighbors of the instances as nodes in a graph, a graph representation vector of each instance by using the encoding function based on graph data of all the instances; a decoding parameter training unit, configured to perform t rounds of training on the decoding parameter; and in each round, extract bs targets from training samples, generate a predicted quantity of each target by using the decoding function based on the graph representation vector of the instance corresponding to each target and non-graph data corresponding to each target, and optimize the decoding parameter based on a loss quantity of the current round that is determined by the predicted quantities and label quantities of the bs targets in the current round, where bs is a natural number, and t is a natural number greater than 1; an encoding parameter training unit, configured to optimize the encoding parameter based on loss quantities of the t rounds; and a training repetition unit, configured to repeatedly use all the preceding units, until a predetermined training termination condition is satisfied.

This specification provides a prediction apparatus of a hybrid graph neural network model. The hybrid graph neural network model includes an encoding function and a decoding function. The encoding function is a graph neural network algorithm with an encoding parameter obtained after training by using the previously described training method of a hybrid graph neural network model. The decoding function is a machine learning algorithm with a decoding parameter obtained after training by using the previously described training method of a hybrid graph neural network model. The apparatus includes the following: a prediction graph representation vector unit, configured to generate, by using instances corresponding to all to-be-predicted targets and several nearest neighbors of the instances as nodes in a graph, a graph representation vector of each instance by using the encoding function based on graph data of all the instances; and a predicted quantity generation unit, configured to generate predicted quantities of the targets by using the decoding function based on the graph representation vectors of the instances corresponding to the to-be-predicted targets and non-graph data corresponding to the to-be-predicted targets.

A computer device provided in this specification includes a memory and a processor. The memory stores a computer program that can be run by the processor; and when running the computer program, the processor performs the method described in the preceding training method of a hybrid graph neural network.

A computer device provided in this specification includes a memory and a processor. The memory stores a computer program that can be run by the processor; and when running the computer program, the processor performs the method described in the preceding prediction method of a hybrid graph neural network model.

A computer-readable storage medium provided in this specification stores a computer program. When the computer program is run by a processor, the method described in the preceding training method of a hybrid graph neural network is performed.

This specification further provides a computer-readable storage medium. The computer-readable storage medium stores a computer program. When the computer program is run by a processor, the method described in the preceding prediction method of a hybrid graph neural network model is performed.

It can be seen from the preceding technical solutions that, in the training method and apparatus embodiments of the hybrid graph neural network model in this specification, the encoding function converts the graph data of the instances into the graph representation vectors, and the decoding function generates the predicted quantities of the training targets based on the graph representation vectors and the non-graph data corresponding to the targets. In addition, the decoding parameter and the encoding parameter are optimized based on differences between the predicted quantities and the label quantities. As such, when the encoding parameter is not changed, the graph data of all the instances is converted into the graph representation vectors at a time. Such practice avoids redundant repetitive processing on the graph data and increases a training speed. In addition, the decoding function comprehensively considers the graph representation vectors and the non-graph data of the instances, thereby implementing efficient training on the hybrid graph neural network model.

In the prediction method and apparatus embodiments of the hybrid graph neural network model in this specification, the encoding function converts the graph data of all the instances into the graph representation vectors at a time, and the decoding function generates the predicted quantities of the training targets based on the graph representation vectors and the non-graph data corresponding to the targets. Such practice avoids redundant repetitive processing on the graph data and increases a prediction speed. In addition, the decoding function comprehensively considers the graph representation vectors and the non-graph data of the instances, thereby implementing efficient prediction of the hybrid graph neural network model.

DESCRIPTION OF EMBODIMENTS

Figure 1:
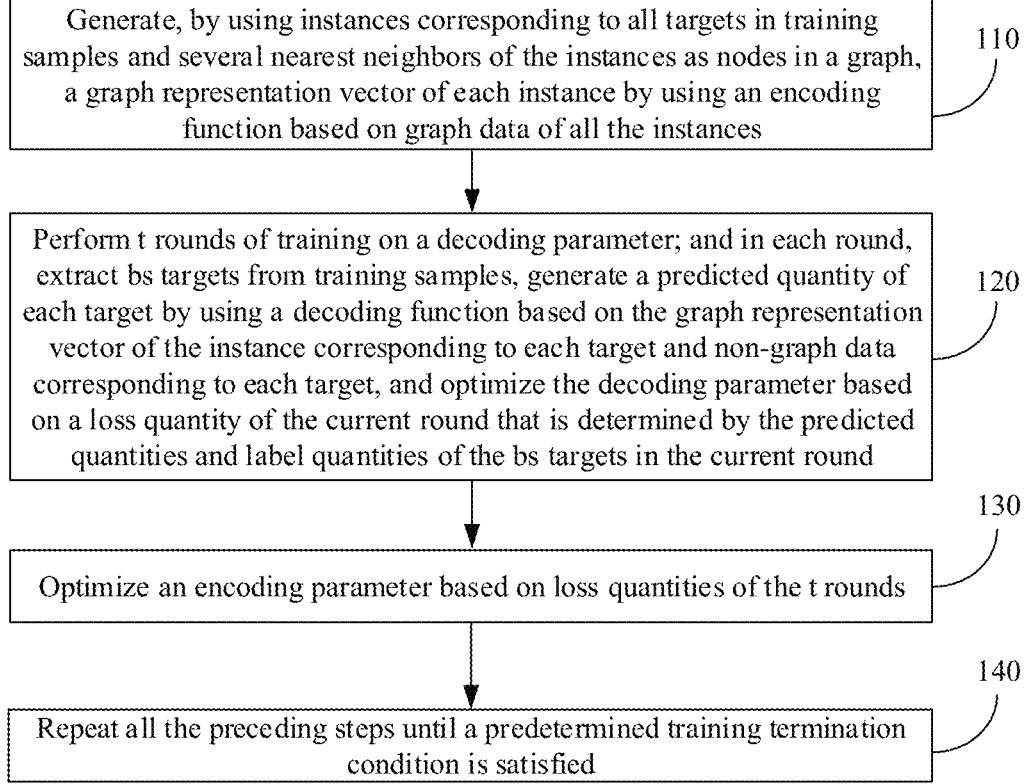
FIG. 1 is a flowchart of a training method of a hybrid graph neural network model, according to Embodiment 1 of this specification.

In the embodiments of this specification, a graph in a hybrid graph neural network model is constructed by using instances as nodes and a relationship between the instances as an edge. An instance can be any subject in an actual application scenario, such as a user, a product, a store, a supplier, a station, a dispatcher, a web page, a user terminal, or a building. The hybrid graph neural network model is used to predict a status, a behavior, etc. associated with an instance. As a prediction target, the status can be information that can describe the subject, such as a category of the instance or an attribute of the instance; and the behavior can be a behavior implemented by the instance, or can be a behavior whose implementation object is the instance. In addition, a degree of matching between a first subject and a second subject can also be used as a prediction target. In such a case, one of the subjects can be used as an instance, and the other can be used as an associated object of the instance.

It is worthwhile to note that a prediction target of the hybrid graph neural network model in the embodiments of this specification is a target related to a determined instance, and all instances in the graph that are involved in prediction of the target can be known based on the prediction target. The target of the hybrid graph neural network model corresponds to at least one instance.

For example, a hybrid graph neural network model is used to predict a consumption amount of a user in several future days. In this case, the hybrid graph neural network model can construct a graph by using a user as an instance, a prediction target of the hybrid graph neural network model is a consumption amount of a user in several future days, and the target corresponds to one determined user. In a second example, a hybrid graph neural network model is used to predict a quantity of times that a web page is referenced by other web pages. In this case, the hybrid graph neural network model uses a web page as an instance, and a target of the hybrid graph neural network model corresponds to one determined web page. In a third example, a hybrid graph neural network model predicts a degree of interest of a user in a to-be-recommended product by using several products that have been clicked on by the user in the past. In this case, the hybrid graph neural network model uses a product as an instance, a prediction target of the hybrid graph neural network model is a degree of matching between a user and a target product, and instances corresponding to the target of the hybrid graph neural network model include the target product and the several products that have been clicked on by the user.

In the embodiments of this specification, the hybrid graph neural network model includes an encoding function and a decoding function. The encoding function can be various graph neural network algorithms, or can be a combination of one or more graph neural network algorithms. The decoding function can be any machine learning algorithm including a graph neural network, or can be a combination of one or more of the preceding machine learning algorithms, for example, can be a deep neural networks (DNN) algorithm, a recurrent neural network (RNN) algorithm, a long short-term memory (LSTM) algorithm, or a Wide&Deep (wide and deep) algorithm, or a combination of these algorithms.

An input of the hybrid graph neural network model is various data related to the instance corresponding to the target. In the data, data that is suitable for expression by graph and also suitable for iteration or processing by using a graph neural network algorithm can be input into the encoding function as graph data of the instance. After the graph data is processed by the encoding function or encoded by the encoding function, a graph representation vector of the instance is output. Other data than the graph data in the data that is input into the graph neural network model is referred to as non-graph data corresponding to the target, and can be used together with the graph representation vector of the instance as an input of the decoding function. After the data is processed by the decoding function, a predicted quantity of the target is output. An output of the decoding function is an output of the hybrid graph neural network model, and the output predicted quantity can be a value or a vector. No limitation is imposed thereto.

In the embodiments of this specification, a learnable parameter used in the encoding function is referred to as an encoding parameter, and a learnable parameter used in the decoding function is referred to as a decoding parameter. A training process of the model is a process of modifying the learnable parameter so that an output of the model is closer to a label quantity, of the target of the model, in a training sample.

In many application scenarios, when the target is predicted by using the hybrid graph neural network model, attribute information of the instance corresponding to the target and behavior information related to the instance need to be considered. Attribute data of the instance and data of a relationship with another instance can be obtained based on the attribute information of the instance. Data of a relationship with another instance and behavior sequence information (that is, time sequence data related to the instance) obtained from historical behavior records related to the instance can be obtained based on the behavior information related to the instance.

When the instance is used as a node in the graph, data of a relationship between the instance and another instance can be conveniently expressed as an edge in the graph, and is suitable for processing by using a graph neural network algorithm. Therefore, the data of a relationship with another instance can generally be used as an input of the encoding function in a form of an attribute of an edge in the graph. However, the time sequence data related to the instance is unsuitable for expression in a form of a graph, and is usually used as an input of the decoding function.

Although the attribute data of the instance can be conveniently expressed as an attribute of a node in the graph, not all of the attribute data is suitable for processing by using a graph neural network algorithm. For example, sparse data in the attribute data of the instance is more suitable as an input of the decoding function. In addition, in some application scenarios, when some attribute data of an instance is used as an input of the decoding function, target prediction has a better effect. In the embodiments of this specification, a part, of the attribute data of the instance, that is input into the encoding function is referred to as self node data of the instance; and a part, of the attribute data of the instance, that is input into the decoding function is referred to as self non-node data of the instance. Self dense data of the instance is usually used as the self node data of the instance, and self sparse data of the instance can be used as the self node data of the instance or the self non-node data of the instance. In some application scenarios, the self dense data of the instance can be used as the self node data of the instance, and the self sparse data of the instance can be used as the self non-node data of the instance. In some other application scenarios, some of the self dense data of the instance can be used as the self node data of the instance, and the other self dense data of the instance and the self sparse data of the instance can be used as the self non-node data of the instance.

Dense data is data that can be represented by using a value or a low-dimension vector. Sparse data is data represented by using a vector whose dimension is very high but has only a small quantity of elements with a value. For example, assume that a user is used as an instance. An account balance and an account age of the user each can be represented as one value and is dense data. A bank card owned by the user is sparse data. Among hundreds of thousands of bank cards worldwide, one user usually has only a few bank cards, which are represented by a vector whose value is 1 and whose dimension is hundreds of thousands but has only a few elements (that is, elements corresponding to the bank cards owned by the user).

Embodiment 1 of this specification provides a new training method of a hybrid graph neural network model. When an encoding parameter is not changed, an encoding function is used to calculate graph representation vectors of all instances at a time; a decoding function is used to calculate predicted quantities of training targets by using the graph representation vectors of the instances and non-graph data related to the instances as an input; and the encoding parameter and a decoding parameter are optimized based on the predicted quantities and label quantities. Such practice avoids redundant repetitive calculation on graph data of the instances, reduces an operation amount, and increases a training speed. In addition, the decoding function comprehensively considers impact of the graph data and the non-graph data on the predicted quantities, thereby implementing efficient training on the hybrid graph neural network model.

Embodiment 1 of this specification can be run on any device that has computing and storage capabilities, such as a mobile phone, a tablet computer, a personal computer (PC), a notebook computer, or a server. Functions in Embodiment 1 of this specification can also be implemented by a logical node running on two or more devices.

In Embodiment 1 of this specification, FIG. 1 shows a procedure of the training method of the hybrid graph neural network model. Training in Embodiment 1 is supervised learning. Training samples include input data of the hybrid graph neural network model and the label quantities (expected outputs) of the targets. The input data includes the graph data of the instances that is input into the encoding function, and the non-graph data, corresponding to the targets, that is input into the decoding function.

Before the training starts, the encoding parameter in the encoding function and the decoding parameter in the decoding function are initialized to initial values. In Embodiment 1 of this specification, the initial values of the encoding parameter and the decoding parameter can be set in any method.

Step 110: Generate, by using instances corresponding to all targets in training samples and several nearest neighbors of the instances as nodes in a graph, a graph representation vector of each instance by using the encoding function based on graph data of all the instances.

For a graph neural network algorithm used by the encoding function, each instance corresponding to each target in a training sample is one node in the graph, and a set of nodes in the graph include not only all the instances corresponding to all the targets in the training samples, but also include other instances that may become the several nearest neighbors of each of the preceding instances. For example, there are 1 billion products on a network shopping platform. Assume that a product is used as an instance of the hybrid graph neural network model. Training samples include 100 million products, and the other 900 million products may become 1-nearest to k-nearest neighbors of the 100 million products in the training samples. In this case, a set of nodes in the hybrid graph neural network model can be the 1 billion products.

The graph data of the instances includes one or more of the following: self node data in attribute data of the instances and data of a relationship with another instance. The self node data of the instances is used to express characteristics of the nodes in the graph, and the data of a relationship with another instance is used to express characteristics of edges in the graph (associations between different nodes). The data of a relationship with another instance can be data of a relationship between a node and a neighbor of a certain order, or can be a combination of data of relationships between the node and several neighbors of various orders. No limitation is imposed thereto.

By using the graph neural network algorithm of the encoding function, the graph data of the instances can be converted into the graph representation vectors of the instances. In Embodiment 1 of this specification, for an established encoding parameter, the graph representation vectors of all the instances in the graph are generated at a time based on the graph data of all the instances. After the encoding parameter is changed (optimized), the process is repeated, and new graph representation vectors of all the instances are generated at a time by using the changed encoding parameter, until the training ends.

Step 120: Perform t (t is a natural number greater than 1) rounds of training on the decoding parameter; and in each round, extract bs (bs is a natural number) targets from training samples, generate a predicted quantity of each target by using the decoding function based on the graph representation vector of the instance corresponding to each target and non-graph data corresponding to each target, and optimize the decoding parameter based on a loss quantity of the current round that is determined by the predicted quantities and label quantities of the bs targets in the current round.

In Embodiment 1 of this specification, for an established encoding parameter, t rounds of training are performed on the decoding parameter. In other words, before the encoding parameter is optimized each time, the decoding parameter is optimized t times.

In each round of training on the decoding parameter, bs targets are extracted from the training samples. As described above, each target corresponds to one or more determined instances. After an instance corresponding to a certain target is obtained, a graph representation vector of the corresponding instance and non-graph data corresponding to the target can be used as an input of the decoding function. An output of the decoding function is a predicted quantity of the target. In the input of the decoding function, the non-graph data corresponding to the target can be one or more of self non-node data of the instance corresponding to the target and time sequence data related to the instance or the instances.

After the predicted quantities of the bs targets in the current round are obtained, the loss quantities of the bs targets extracted in the current round can be obtained based on the predicted quantity of each target and the label quantity of the target in the training sample, and the decoding parameter can be optimized based on the loss quantity of the current round. Any loss function can be selected based on characteristics of an actual application scenario to calculate the loss quantities of the bs targets in the current round. For example, a cross entropy loss function, a least square loss function, an absolute error loss function, or a mean square error loss function can be used. Similarly, any optimization function, such as a gradient descending optimizer or an Adam optimizer, can be used to modify the decoding parameter based on the loss quantity of the current round. No limitation is imposed thereto.

For example, a predetermined loss function can be used to calculate the loss quantity of each target in the current round based on the predicted quantity and the label quantity of each target, and then the loss quantity of the current round is obtained based on the loss quantities of the bs targets. A gradient of the loss quantity of the current round for the decoding parameter is calculated, and the decoding parameter is optimized based on the gradient obtained by calculation.

After the t rounds of training on the decoding parameter are performed, step 130 is performed.

Step 130: Optimize the encoding parameter based on loss quantities of the t rounds.

Any optimization function can be selected based on characteristics of an actual application scenario to modify the encoding parameter based on the loss quantities of the t rounds. No limitation is imposed thereto.

For example, gradients of the loss quantity of each round for the graph representation vectors of the instances corresponding to the bs targets in this round can be first calculated based on the loss quantity in the round. As such, for the loss quantities of the t rounds, a total of bs×t gradients of the loss quantities for the graph representation vectors can be obtained. Then, the bs×t gradients of the loss quantities for the graph representation vectors are then used to optimize the encoding parameter.

In the preceding example, when the encoding parameter is optimized by using the bs×t gradients of the loss quantities for the graph representation vectors, gradients of the t rounds can be first accumulated separately on the graph representation vectors of the instances corresponding to the bs targets in each round. Then, gradients of the loss quantities for the encoding parameter are determined by using the gradients accumulated on the graph representation vectors. Finally, the encoding parameter is optimized by using the gradients of the loss quantities for the encoding parameter. In this optimization method, when instances corresponding to targets in different rounds are the same or repeated, gradients of more than one round are accumulated on a graph representation vector of the same or repeated instance. A specific accumulation method is not limited, for example, can be summation of gradients or weighted summation of gradients.

Step 140: Repeat all the preceding steps until a predetermined training termination condition is satisfied.

After optimization on the encoding parameter is completed, it is determined whether the predetermined training termination condition is satisfied. If yes, the training on the hybrid graph neural network model is completed, and the training procedure ends. If no, steps 110 to 130 are repeatedly performed.

Specifically, when the predetermined termination condition is not satisfied, step 110 is performed to calculate graph representation vectors of all the instances based on an updated encoding parameter, and then the newly calculated graph representation vectors are used to perform the t rounds of training on the decoding parameter in step 120 and optimize the encoding parameter in step 130.

In Embodiment 1 of this specification, any predetermined training termination condition can be used. For example, the predetermined training termination condition can be as follows: The encoding parameter is optimized R (R is a natural number greater than 1) times. As such, the training on the hybrid graph neural network model is completed after steps 110 to 130 are repeated R times.

The following provides a first example implementation of Embodiment 1 of this specification. In the first example implementation, the hybrid graph neural network model is used to classify instances. All instances corresponding to all targets in training samples and other instances that may become several nearest neighbors of these instances form a node set $\mathcal{V}$, and all relationships between nodes form an edge set $\mathcal{E}$, so as to construct a graph $\mathcal{G} = \{ \mathcal{V}, \mathcal{E} \}$. Graph data of the instances includes self node data of the instances and data of a relationship with another instance, and non-graph data corresponding to the targets includes self non-node data of the instances and time sequence data generated based on historical behavior information of the instances. X is self node data of all the instances, E is data of relationships between all the instances and other instances, A is an adjacency matrix of topological relationships between nodes and edges in the graph $\mathcal{G}$, $f$ is the encoding function, W is the encoding parameter, g is the decoding function, and $\omega$ is the decoding parameter.

A target of each training sample includes a target identifier ID and a label quantity of the target, and a label quantity of a target $ID_i$ is $Y_i$. The target identifier ID indicates an instance corresponding to the target, and the instance corresponding to the target $ID_i$ is $v_i$; and the label quantity $Y_i$ of the target $ID_i$ represents a category of the target $ID_i$. A graph representation vector of the instance $v_i$ is $H_i$, self non-node data of the instance $v_i$ is $B_i$, and time sequence data corresponding to the target $ID_i$ is $S_i$.

Figure 2:
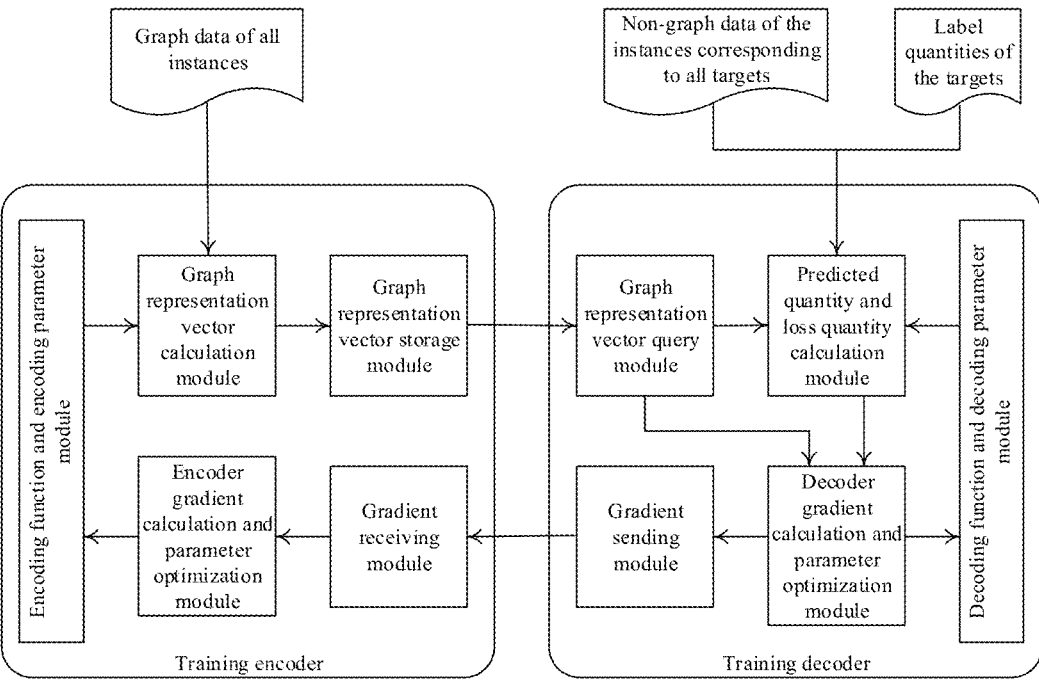
FIG. 2 is a logical structural diagram of a training system of a hybrid graph neural network model in two example implementations, according to Embodiment 1 of this specification.

In the first example implementation, a logical structure of a training system of the hybrid graph neural network model is shown in FIG. 2. The training system includes a training encoder and a training decoder. The training encoder includes an encoding function and encoding parameter module, a graph representation vector calculation module, a graph representation vector storage module, a training encoder gradient calculation and parameter optimization module, and a gradient receiving module. The training decoder includes a decoding function and decoding parameter module, a graph representation vector query module, a predicted quantity and loss quantity calculation module, a training decoder gradient calculation and parameter optimization module, and a gradient sending module. The encoding function and encoding parameter module stores the encoding function $f$ and the encoding parameter W, and the decoding function and decoding parameter module stores the decoding function g and the decoding parameter $\omega$. The training system runs according to the following steps.

Step S02: When training starts, set the encoding parameter W in the encoding function and encoding parameter module and the decoding parameter $\omega$ in the decoding function and decoding parameter module to initial values, set a quantity r1 of encoding parameter optimization times to 0, and set a quantity r2 of decoding parameter optimization times to 0.

Step S04: In the training encoder, based on the current encoding parameter W, the graph representation vector calculation module calculates graph representation vectors $$\{H_i^{r1}\}$$

of all instances (including all the instances in the training samples and several nearest neighbors of the instances) in the node set V at a time by using formula 1.

$$H^{r1} = f(X, A, E | W) \qquad \text{formula 1}$$

Step S06: In the training encoder, the graph representation vector storage module stores a correspondence between an identifier $v_i$ of each instance and a graph representation vector $$H_i^{r1}$$

of the instance by using the identifier of the instance as an index.

Step S08: In the training decoder, extract bs targets from a target set of training samples. For each extracted target $ID_i$ ($i \in [1, bs]$), the graph representation vector query module finds, from the graph representation vector storage module of the training encoder, the graph representation vector $$H_i^{r1}$$

of the instance $v_i$ corresponding to the target $ID_i$, and splices the graph representation vector $$H_i^{r1},$$

self non-node data $B_i$ of the instance $v_i$, and time sequence data $S_i$ corresponding to the target $ID_i$ to form a group of inputs $$(H_i^{r1}, B_i, S_i)(i \in [1, bs])$$

of the decoding function g.

Step S10: In the training decoder, the predicted quantity and loss quantity calculation module obtains, based on the current decoding parameter $\omega$ by using formula 2, predicted quantities $\{\hat{Y}_i\}$, $i \in [1, bs]$ of the bs targets extracted in step S08. Assume that a loss function is l. The predicted quantity and loss quantity calculation module obtains a loss quantity $\mathcal{L}_{r2}$ of the current round (that is, round r2) by using formula 3.

$$\hat{Y}_i = g(H_i^{r1}, B_i, S_i | \omega) \qquad \text{formula 2}$$

$$\mathcal{L}_{r2} = \sum_{i=1}^{bs} l(Y_i, \hat{Y}_i) \qquad \text{formula 3}$$

Step S12: In the training decoder, the training decoder gradient calculation and parameter optimization module obtains, based on the loss quantity $\mathcal{L}_{r2}$ of the current round, a gradient of the loss quantity of the current round for the decoding parameter by using formula 4, and then optimizes the decoding parameter based on the gradient of the loss quantity of the current round for the decoding parameter, and updates the decoding parameter in the decoding function and decoding parameter module to an optimized value. If the decoding parameter is optimized by using a gradient descent method, the optimized decoding parameter can be obtained by using formula 5. In formula 5, $\alpha$ is a learning rate in the gradient descent method.

$$\frac{\partial \mathcal{L}_{r2}}{\partial \omega} = \sum_{i=1}^{bs} \frac{\partial \mathcal{L}_{r2}}{\partial \hat{Y}_i} \frac{\partial \hat{Y}_i}{\partial \omega}, \forall i \in [1, bs] \qquad \text{formula 4}$$

$$\omega := \omega - \alpha \frac{\partial \mathcal{L}_{r2}}{\partial \omega} \qquad \text{formula 5}$$

Step S14: In the training decoder, the training decoder gradient calculation and parameter optimization module calculates gradients of the loss quantity $\mathcal{L}_{r2}$ of the current round for the bs graph representation vectors by using formula 6, and transfers bs calculated gradient vectors to the gradient sending module.

$$\frac{\partial \mathcal{L}_{r2}}{\partial H_i^{r1}} = \frac{\partial \mathcal{L}_{r2}}{\partial \hat{Y}_i} \frac{\partial \hat{Y}_i}{\partial H_i^{r1}}, \forall i \in [1, bs] \qquad \text{formula 6}$$

Step S16: In the training decoder, the gradient sending module sends the bs gradient vectors to the gradient receiving module of the training encoder. In the training encoder, the gradient receiving module of the training encoder stores the bs received gradient vectors.

Step S18: Increase r2 by 1. If r2 cannot be evenly divided by t, proceed to step S08. If r2 can be evenly divided by t, perform step S20.

Step S20: In the training encoder, the training encoder gradient calculation and parameter optimization module reads bs×t stored gradient vectors from the gradient receiving module, calculates gradients $$\frac{\partial L}{\partial W}$$

of loss quantities of the t rounds for the encoding parameter by using formula 7, and then optimizes the encoding parameter based on $$\frac{\partial L}{\partial W}.$$

It the encoding parameter is optimized by using a gradient descent method, the optimized encoding parameter can be obtained by using formula 8.

$$\frac{\partial L}{\partial W} = \sum_{i=1}^{bs \times t} \frac{\partial \mathcal{L}_{r2}}{\partial H_i^{r1}} \frac{\partial H_i^{r1}}{\partial W} \qquad \text{formula 7}$$

$$W := W - \alpha \frac{\partial L}{\partial W} \qquad \text{formula 8}$$

Step S22: Increase r1 by 1. If r1<R, proceed to step S04; or otherwise, perform step S24.

Step S24: The training ends. In this case, an encoding parameter $W_E$ in the encoding function and encoding parameter module is an encoding parameter obtained after training, and a decoding parameter $\omega_E$ in the decoding function and decoding parameter module is a decoding parameter obtained after training.

The following provides a second example implementation of Embodiment 1 of this specification. In the second example implementation, the hybrid graph neural network model is used to predict a degree of matching between an instance and an object. Each training sample includes a target instance $v_i$ of a certain object $u_i$ and N instances $v_{ij}$ ($j \in [1, N]$) of a historical behavior of the object $u_i$. As such, in the second example implementation, a quantity of instances corresponding to each target is (N+1), that is, $v_i$ and $v_{ij}$, $j \in [1, N]$. The training sample further includes a target identifier ID and a label quantity of the target. A label quantity of a target $ID_i$ is $Y_i$, and a representation vector of an object $u_i$ of the target $ID_i$ is $U_i$.

All instances corresponding to all targets in training samples and other instances that may become several nearest neighbors of these instances form a node set V, and all relationships between nodes form an edge set $\mathcal{E}$, so as to construct a graph $\mathcal{G} = \{ \mathcal{V}, \varepsilon \}$. Graph data of the instances includes self node data of the instances and data of a relationship with another instance, and non-graph data corresponding to the targets includes representation vectors of objects of the targets. X is self node data of all the instances, E is data of relationships between all the instances and other instances, A is an adjacency matrix of topological relationships between nodes and edges in the graph $\mathcal{G}$, $f$ is the encoding function, W is the encoding parameter, g is the decoding function, and $\omega$ is the decoding parameter.

In the second example implementation, a logical structure of a training system of the hybrid graph neural network model is shown in FIG. 2. The training system runs according to the following steps.

Step S32: When training starts, set the encoding parameter W in the encoding function and encoding parameter module and the decoding parameter $\omega$ in the decoding function and decoding parameter module to initial values, set a quantity r1 of encoding parameter optimization times to 0, and set a quantity r2 of decoding parameter optimization times to 0.

Step S34: In the training encoder, based on the current encoding parameter W, the graph representation vector calculation module calculates graph representation vectors $$\{H_i^{r1}\}$$

of all instances (including all the instances in the training samples and several nearest neighbors of the instances) in the node set $\mathcal{V}$ at a time by using formula 1.

Step S36: In the training encoder, the graph representation vector storage module stores a correspondence between an identifier $v_i$ of each instance and a graph representation vector $$H_i^{r1}$$

of the instance by using the identifier of the instance as an index.

Step S38: In the training decoder, extract bs targets from a target set of training samples. For each extracted target $ID_i$ ($i \in [1, bs]$), the graph representation vector query module finds, from the graph representation vector storage module of the training encoder, graph representation vectors $$H_i^{r1}$$

and $$H_{ij}^{r1}, j \in [1, N]$$

of the instances $v_i$ and $v_{ij}, j \in [1, N]$ corresponding to the target $ID_i$, and splices the graph representation vectors and a representation vector $U_i$ of an object corresponding to the target $ID_i$ to form a group of inputs $$\left( H_i^{r1}, H_{ij}^{r1}, U_i \right)(i \in [1, bs], j \in [1, N])$$

of the decoding function g.

Step S40: In the training decoder, the predicted quantity and loss quantity calculation module obtains, based on the current decoding parameter $\omega$ by using formula 9, predicted quantities $\{\hat{Y}_i\}$, $i \in [1, bs]$ of the bs targets extracted in step S38. Assume that a loss function is l. The predicted quantity and loss quantity calculation module obtains a loss quantity $\mathcal{L}_{r2}$ of the current round (that is, round r2) by using formula 3.

$$\hat{Y}_i = g\left( H_i^{r1}, H_{ij}^{r1}, U_i | \omega \right) \qquad \text{formula 9}$$

Step S42: In the training decoder, the training decoder gradient calculation and parameter optimization module obtains, based on the loss quantity $\mathcal{L}_{r2}$ of the current round, a gradient of the loss quantity of the current round for the decoding parameter by using formula 4, and then optimizes the decoding parameter based on the gradient of the loss quantity of the current round for the decoding parameter, and updates the decoding parameter in the decoding function and decoding parameter module to an optimized value.

Step S44: In the training decoder, the training decoder gradient calculation and parameter optimization module calculates gradients of the loss quantity $\mathcal{L}_{r2}$ of the current round for the $bs \times (N+1)$ graph representation vectors by using formula 6 and formula 10, and transfers $bs \times (N+1)$ calculated gradient vectors to the gradient sending module.

$$\frac{\partial \mathcal{L}_{r2}}{\partial H_{ij}^{r1}} = \frac{\partial \mathcal{L}_{r2}}{\partial \hat{Y}_i} \frac{\partial \hat{Y}_i}{\partial H_i^{r1}}, \forall i \in [1, bs], \forall j \in [1, N] \qquad \text{formula 10}$$

Step S46: In the training decoder, the gradient sending module sends the $bs \times (N+1)$ gradient vectors to the gradient receiving module of the training encoder. In the training encoder, the gradient receiving module of the training encoder stores the $bs \times (N+1)$ received gradient vectors.

Step S48: Increase r2 by 1. If r2 cannot be evenly divided by t, proceed to step S38. If r2 can be evenly divided by t, perform step S50.

Step S50: In the training encoder, the training encoder gradient calculation and parameter optimization module reads $bs \times (N+1) \times t$ stored gradient vectors from the gradient receiving module, calculates gradients $$\frac{\partial L}{\partial W}$$

of loss quantities of the t rounds for the encoding parameter by using formula 11, and then optimizes the encoding parameter based on $$\frac{\partial L}{\partial W}.$$

$$\frac{\partial L}{\partial W} = \sum_{i=1}^{bs \times (N+1) \times t} \frac{\partial \mathcal{L}_{r2}}{\partial H_i^{r1}} \frac{\partial H_i^{r1}}{\partial W} \qquad \text{formula 11}$$

Step S52: Increase r1 by 1. If r1<R, proceed to step S34; or otherwise, perform step S54.

Step S54: The training ends. In this case, an encoding parameter $W_E$ in the encoding function and encoding parameter module is an encoding parameter obtained after training, and a decoding parameter $\omega_E$ in the decoding function and decoding parameter module is a decoding parameter obtained after training.

It can be seen that, in Embodiment 1 of this specification, when the encoding parameter is not changed, the encoding function is used to calculate the graph representation vectors of all the instances at a time; the decoding function is used to generate the predicted quantities of the training targets by using the graph representation vectors and the non-graph data corresponding to the targets; and the encoding parameter and the decoding parameter are optimized based on the predicted quantities and label quantities. Such practice avoids redundant repetitive processing on the graph data, reduces an operation amount, and increases a training speed. The decoding function comprehensively considers the graph representation vectors and the non-graph data of the instances, thereby implementing efficient training on the hybrid graph neural network model.

Embodiment 2 of this specification provides a new prediction method of a hybrid graph neural network model. An encoding function is used to calculate graph representation vectors of all instances at a time; and a decoding function is used to calculate predicted quantities of to-be-predicted targets by using the graph representation vectors of the instances and non-graph data corresponding to the targets as an input. Such practice avoids redundant repetitive calculation on graph data of the instances, reduces an operation amount, and increases a prediction speed. In addition, the decoding function comprehensively considers impact of the graph data and the non-graph data on the predicted quantities, thereby implementing efficient prediction of the hybrid graph neural network model.

Embodiment 2 of this specification can be run on any device that has computing and storage capabilities, such as a mobile phone, a tablet computer, a PC, a notebook computer, or a server. Functions in Embodiment 2 of this specification can also be implemented by a logical node running on two or more devices.

In Embodiment 2 of this specification, the hybrid graph neural network model is a hybrid graph neural network model obtained after training by using the training method in Embodiment 1 of this specification. That is, in the hybrid graph neural network model in Embodiment 2, the encoding function is a graph neural network algorithm that includes the encoding parameter obtained after training by using the method in Embodiment 1 of this specification, and the decoding function is a machine learning algorithm that includes the decoding parameter obtained after training by using the method in Embodiment 1 of this specification. Input data of the hybrid graph neural network model includes the graph data of the instances that is input into the encoding function, and the non-graph data, corresponding to the targets, that is input into the decoding function.

Figure 3:
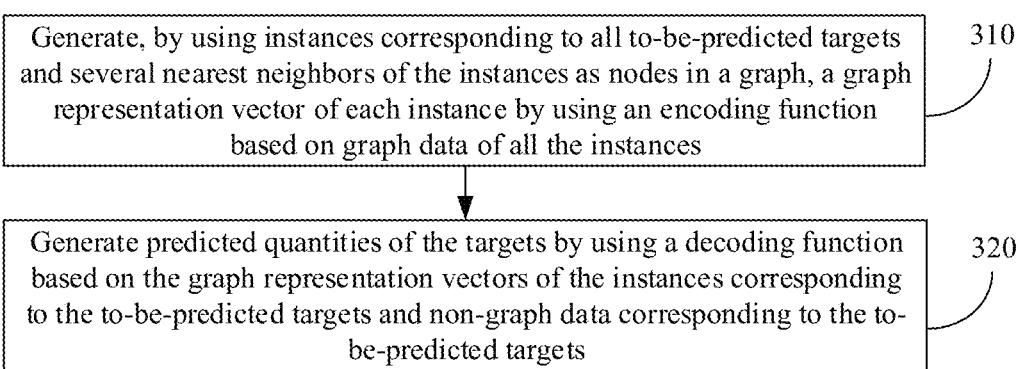
FIG. 3 is a flowchart of a prediction method of a hybrid graph neural network model, according to Embodiment 2 of this specification.

In Embodiment 2 of this specification, FIG. 3 shows a procedure of the prediction method of the hybrid graph neural network model. As described above, each to-be-predicted target of the hybrid graph neural network model corresponds to one or more instances.

Step 310: Generate, by using instances corresponding to all to-be-predicted targets and several nearest neighbors of the instances as nodes in a graph, a graph representation vector of each instance by using the encoding function based on graph data of all the instances.

For a graph neural network algorithm used by the encoding function, each instance corresponding to each target in a training sample is one node in the graph, and a set of nodes in the graph include not only all the instances corresponding to all the targets in the training samples, but also include other instances that may become the several nearest neighbors of each of the preceding instances.

The graph data of the instances includes one or more of the following: self node data in attribute data of the instances and data of a relationship with another instance. The self node data of the instances is used to express characteristics of the nodes in the graph, and the data of a relationship with another instance is used to express characteristics of edges in the graph (associations between different nodes). The data of a relationship with another instance can be data of a relationship between a node and a neighbor of a certain order, or can be a combination of data of relationships between the node and several neighbors of various orders. No limitation is imposed thereto.

The encoding function uses a graph neural network algorithm obtained after training, and generates the graph representation vectors for all the instances in the graph at a time based on the graph data of all the instances.

Step 320: Generate the predicted quantities of the targets by using the decoding function based on the graph representation vectors of the instances corresponding to the to-be-predicted targets and the non-graph data corresponding to the to-be-predicted targets.

After the graph representation vectors of all the instances are generated, for a to-be-predicted target or some to-be-predicted targets, the graph representation vector of the instance corresponding to each target and the non-graph data corresponding to each target can be input into the decoding function obtained after training. An output of the decoding function is a predicted quantity of each target. In the input of the decoding function, the non-graph data corresponding to the target can be one or more of self non-node data of the instance and time sequence data related to the instance corresponding to the target.

In some application scenarios, a quantity of to-be-predicted targets is relatively large. In this case, ps (ps is a natural number) targets can be predicted in each round, until all the targets are predicted. Specifically, in each round, ps targets can be extracted from a set of to-be-predicted targets. For the extracted ps targets, the graph representation vector of the instance corresponding to each target and the non-graph data corresponding to each target can be separately input into the decoding function, so that a machine learning algorithm of the decoding function obtains a predicted quantity of each of the ps targets. Then, the ps targets extracted in the current round are deleted from the target set. If the target set is not empty, a next round is continued, and ps targets are extracted for prediction, until the target set is empty. It is worthwhile to note that, in the last round before the target set becomes empty, a quantity of extracted targets may be less than ps.

The following provides a first example implementation of Embodiment 2 of this specification. The graph neural network model in the first example implementation is a graph neural network model obtained after training by using the first example implementation of Embodiment 1 of this specification. Therefore, in the first example implementation, the graph neural network model is used to classify instances. The encoding function f, the decoding function g, the graph data of the instances, the non-graph data corresponding to the targets in the first example implementation are the same as those in the first example implementation of Embodiment 1, but the encoding parameter is $W_E$ and the decoding parameter is $\omega_E$.

In the first example implementation, the instances corresponding to all the to-be-predicted targets and several nearest neighbors of these instances form a node set $\mathcal{V}$, and all relationships between nodes form an edge set $\mathcal{E}$, so as to construct a graph $\mathcal{G} = \{ \mathcal{V}, \mathcal{E} \}$. X is self node data of all the instances, E is data of relationships between all the instances and other instances, A is an adjacency matrix of topological relationships between nodes and edges in the graph $\mathcal{G}$. Each to-be-predicted target includes a target identifier, an instance corresponding to a target $ID_i$ is $v_i$, a graph representation vector of the instance $v_i$ is $H_i$, self non-node data of the instance $v_i$ is $B_i$, and time sequence data of the instance $v_i$ is $S_i$.

Figure 4:
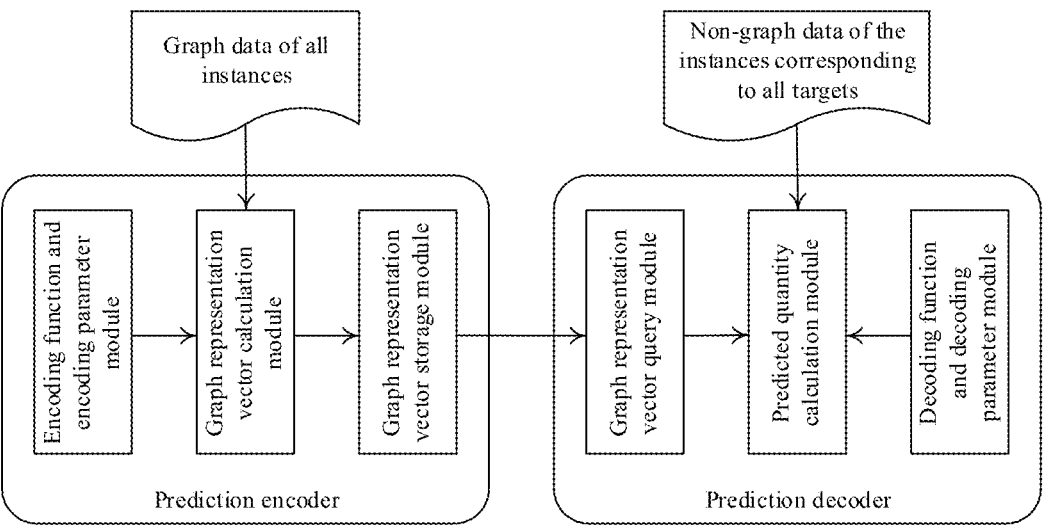
FIG. 4 is a logical structural diagram of a prediction system of a hybrid graph neural network model in two example implementations, according to Embodiment 2 of this specification.

In the first example implementation, a logical structure of a prediction system of the hybrid graph neural network model is shown in FIG. 4. The prediction system includes a prediction encoder and a prediction decoder. The prediction encoder includes an encoding function and encoding parameter module, a graph representation vector calculation module, and a graph representation vector storage module. The prediction decoder includes a decoding function and decoding parameter module, a graph representation vector query module, and a predicted quantity calculation module. The encoding function and encoding parameter module stores the encoding function $f$ and the encoding parameter $W_E$ obtained after training, and the decoding function and decoding parameter module stores the decoding function g and the decoding parameter $\omega_E$ obtained after training. The prediction system runs according to the following steps.

Step S62: In the prediction encoder, based on the encoding parameter $W_E$, the graph representation vector calculation module calculates graph representation vectors $\{H_i\}$ of all nodes (including all the to-be-predicted instances and several nearest neighbors of the instances) in the graph at a time by using formula 12.

$$H = f(X, A, E | W_E) \qquad \text{formula 12}$$

Step S64: In the prediction encoder, the graph representation vector storage module stores a correspondence between an identifier $v_i$ of each instance and a graph representation vector $H_i$ of the instance by using the identifier of the instance as an index.

Step S66: Let a variable Ct=ps.

Step S68: In the prediction decoder, extract Ct targets from the set of to-be-predicted targets (if a total quantity of the targets in the target set is less than ps, extract all remaining targets and change a value of Ct to the total quantity of the targets in the target set). For each extracted target $ID_i$ ($i \in [1, Ct]$), the graph representation vector query module finds, from the graph representation vector storage module of the prediction encoder, the graph representation vector $H_i$ of the instance $v_i$ corresponding to the target $ID_i$, and splices the graph representation vector, self non-node data $B_i$ of the instance $v_i$, and time sequence data $S_i$ to form a group of inputs $(H_i, B_i, S_i)$ ($i \in [1, Ct]$) of the decoding function g.

Step S70: In the prediction decoder, the predicted quantity calculation module obtains, based on the decoding parameter $\omega_E$ by using formula 13, predicted quantities $\{\hat{Y}_i\}$, $i \in [1, Ct]$ of the Ct targets in the current round extracted in step S68.

$$\hat{Y}_i = g(H_i, B_i, S_i | \omega_E) \qquad \text{formula 13}$$

Step S72: Delete the Ct extracted targets in the current round from the set of to-be-predicted targets, and if the target set becomes empty, the prediction ends, or if the target set is not empty, step S68 is performed.

The following provides a second example implementation of Embodiment 2 of this specification. The graph neural network model in the second example implementation is a graph neural network model obtained after training by using the second example implementation of Embodiment 1 of this specification. Therefore, in the second example implementation, the graph neural network model is used to predict a degree of matching between an instance and an object. An encoding function f, a decoding function g, graph data of instances, non-graph data corresponding to targets in the second example implementation are the same as those in the second example implementation of Embodiment 1, but an encoding parameter is $W_E$ and a decoding parameter is $\omega_E$.

In the second example implementation, each to-be-predicted target includes a target identifier, a target $ID_i$ corresponds to (N+1) instances, that is, $v_i$ and $v_{ij}$, $j \in [1, N]$, a graph representation vector of the instance $v_i$ is $H_i$, and a representation vector of an object $u_i$ of the target $ID_i$ is $U_i$.

In the second example implementation, the instances corresponding to all the to-be-predicted targets and several nearest neighbors of these instances form a node set $\mathcal{V}$, and all relationships between nodes form an edge set $\mathcal{E}$, so as to construct a graph $\mathcal{G} = \{\mathcal{V}, \mathcal{E}\}$. X is self node data of all the instances, E is data of relationships between all the instances and other instances, A is an adjacency matrix of topological relationships between nodes and edges in the graph $\mathcal{G}$.

In the second example implementation, a logical structure of a prediction system of the hybrid graph neural network model is shown in FIG. 4. The prediction system runs according to the following steps.

Step S82: In the prediction encoder, based on the trained encoding parameter $W_E$, the graph representation vector calculation module calculates graph representation vectors $\{H_i\}$ of all instances (including all the to-be-predicted instances and several nearest neighbors of the instances) at a time by using formula 12.

Step S84: In the prediction encoder, the graph representation vector storage module stores a correspondence between an identifier $v_i$ of each instance and a graph representation vector $H_i$ of the instance by using the identifier of the instance as an index.

Step S86: Let a variable Ct=ps.

Step S88: In the prediction decoder, extract Ct targets from the set of to-be-predicted targets (if a total quantity of the targets in the target set is less than ps, extract all remaining targets and change a value of Ct to the total quantity of the targets in the target set). For each extracted target $ID_i$ ($i \in [1, Ct]$), the graph representation vector query module finds, from the graph representation vector storage module of the prediction encoder, a graph representation vector $H_i$ of the instance $v_i$ corresponding to the target $ID_i$ and graph representation vectors of instances $v_{ij}$, $j \in [1, N]$ corresponding to the target $ID_i$, and splices the graph representation vectors and a representation vector $U_i$ of an object corresponding to the target $H_{ij}$, $j \in [1, N]$ to form a group of inputs $(H_i, H_{ij}, U_i)$ ($i \in [1, Ct]$) of the decoding function g.

Step S90: In the prediction decoder, the predicted quantity calculation module obtains, based on the decoding parameter $\omega_E$ by using formula 14, predicted quantities $\{\hat{Y}_i\}$, $i \in [1, Ct]$ of the Ct targets in the current round extracted in step S88.

$$\hat{Y}_i = g(H_i, H_{ij}, U_i | \omega_E) \qquad \text{formula 14}$$

Step S92: Delete the Ct extracted targets in the current round from the set of to-be-predicted targets, and if the target set becomes empty, the prediction ends, or if the target set is not empty, step S88 is performed.

It can be seen that, in Embodiment 2 of this specification, the encoding function is used to calculate the graph representation vectors of all the instances at a time; and the decoding function is used to generate the predicted quantities of the training targets based on the graph representation vectors and the non-graph data corresponding to the targets. Such practice avoids redundant repetitive processing on the graph data, reduces an operation amount, and increases a prediction speed. The decoding function comprehensively considers the graph representation vectors and the non-graph data of the instances, thereby implementing efficient prediction of the hybrid graph neural network model.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing are feasible or may be advantageous.

In a first application example of this specification, an Internet service provider uses a hybrid graph neural network model to evaluate a category of a user, and performs, based on the category of the user, service processing corresponding to the category for a request from the user, so that a more targeted service can be provided for the user, thereby improving service processing efficiency. A form of the category and the corresponding service processing can be determined based on a specific service requirement. No limitation is imposed. For example, the category can be a consumption level, a credit level, an active level, or a security level, etc. The corresponding service processing can be applying different service procedures and adopting different service processing parameters for users of different categories, etc.

The Internet service provider constructs the hybrid graph neural network model by using a user as an instance. A training or prediction target of the model is a category of a user. In the hybrid graph neural network model, graph data of an instance is a part (such as dense data in user attribute data and data of a relationship between users), of user data, that is expressed as attributes of nodes and edges in a graph, and a remaining part (such as sparse data in the user attribute data) of the user data and historical behavior time sequence data generated based on historical behavior records of a user are used as non-graph data corresponding to the target.

The Internet service provider adopts the first example implementation of Embodiment 1 of this specification to perform training on the hybrid graph neural network model. After the training is completed, the first example implementation of Embodiment 2 of this specification is adopted to predict the category of the user based on a hybrid graph neural network model obtained after training, and perform, based on a predicted category, service processing corresponding to the category for the user.

In a second application example of this specification, an Internet service provider uses a hybrid graph neural network model to evaluate a degree of matching between a user and an object, and recommends an object to a user based on the degree of matching between a user and an object, so as to increase efficiency of information acquisition by the user and improve user satisfaction. A specific form of the object is not limited, for example, can be a product, a promotional activity, an advertisement, or a search result for a user search request, etc.

The Internet service provider constructs the hybrid graph neural network model by using an object as an instance. A training or prediction target of the model is a degree of matching between a user and an object. In the hybrid graph neural network model, graph data of an instance is a part, of object data, that is expressed as attributes of nodes and edges in a graph, and a representation vector of the user is used as non-graph data corresponding to the target. Based on historical behavior records of the user, graph representation vectors of N objects on which the user had performed a behavior (such as browse, add to favorites, or follow) are also used as an input of a decoding function. As such, an instance corresponding to each target includes (N+1) objects, that is, a to-be-recommended object and the N objects on which the user had performed a historical behavior.

The Internet service provider adopts the second example implementation of Embodiment 1 of this specification to perform training on the hybrid graph neural network model. After the training is completed, the second example implementation of Embodiment 2 of this specification is adopted to predict a degree of matching between a user and a to-be-recommended object, and recommend, to the user, several predicted to-be-recommended objects with higher degrees of matching with the user.

Figure 5:
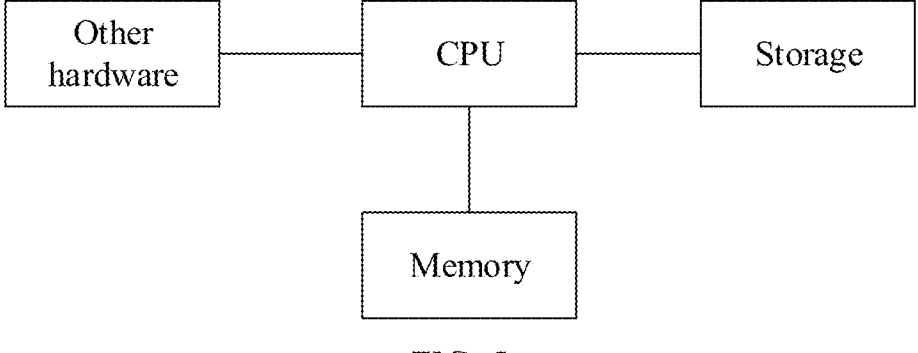
FIG. 5 is a hardware structural diagram of a device that runs some embodiments of this specification.

Corresponding to the preceding procedural implementation, some embodiments of this specification further provide a training apparatus of a hybrid graph neural network and a prediction apparatus of a hybrid graph neural network. Both apparatuses can be implemented by software, hardware, or a combination of software and hardware. Software implementation is used as an example. As a logical apparatus, each of the two apparatuses is formed by a central processing unit (CPU) of a device housing the apparatus, by reading corresponding computer program instructions to a memory for running. From a hardware perspective, in addition to a CPU, a memory, and a storage shown in FIG. 5, a device housing the training apparatus or the prediction apparatus of a hybrid graph neural network generally further includes other hardware such as a chip used to send and receive wireless signals and/or other hardware such as a board used to implement a network communication function.

Figure 6:
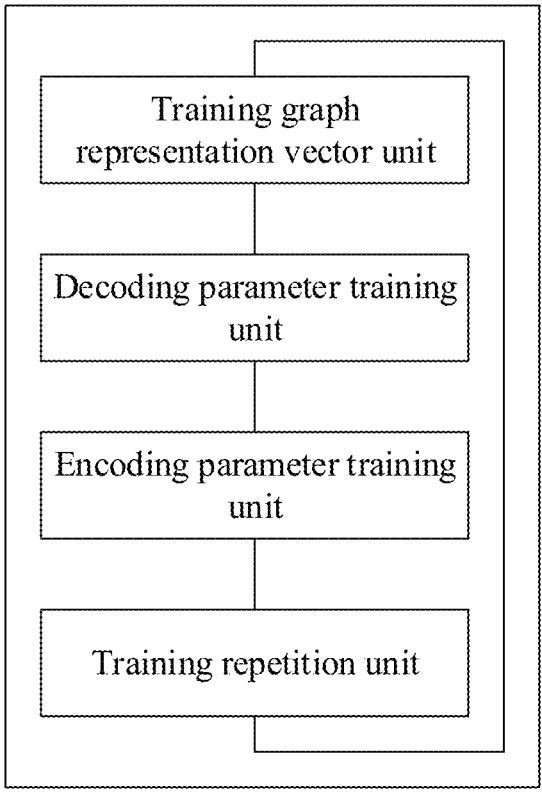
FIG. 6 is a logical structural diagram of a training apparatus of a hybrid graph neural network model, according to some embodiments of this specification.

FIG. 6 shows a training apparatus of a hybrid graph neural network model, according to some embodiments of the specification. The hybrid graph neural network model includes an encoding function and a decoding function. The encoding function is a graph neural network algorithm with an encoding parameter and a combination thereof. The decoding function is a machine learning algorithm with a decoding parameter and a combination thereof. The apparatus includes a training graph representation vector unit, a decoding parameter training unit, an encoding parameter training unit, and a training repetition unit. The training graph representation vector unit is configured to generate, by using instances corresponding to all targets in training samples and several nearest neighbors of the instances as nodes in a graph, a graph representation vector of each instance by using the encoding function based on graph data of all the instances. The decoding parameter training unit is configured to perform t rounds of training on the decoding parameter; and in each round, extract bs targets from training samples, generate a predicted quantity of each target by using the decoding function based on the graph representation vector of the instance corresponding to each target and non-graph data corresponding to each target, and optimize the decoding parameter based on a loss quantity of the current round that is determined by the predicted quantities and label quantities of the bs targets in the current round, where bs is a natural number, and t is a natural number greater than 1. The encoding parameter training unit is configured to optimize the encoding parameter based on loss quantities of the t rounds. The training repetition unit is configured to repeatedly use all the preceding units, until a predetermined training termination condition is satisfied.

In an example, the encoding parameter training unit is specifically configured to calculate gradients of the loss quantity of each round for the graph representation vectors of the instances corresponding to the bs targets in the current round, and optimize the encoding parameter based on $bs \times t$ gradients.

In the preceding example, that the encoding parameter training unit optimizes the encoding parameter based on $bs \times t$ gradients includes accumulating gradients of the t rounds separately on the graph representation vectors of the instances corresponding to the bs targets in each round, determining gradients of loss quantities for the encoding parameter based on the accumulated gradients on the graph representation vectors, and optimizing the encoding parameter by using the gradients of the loss quantities for the encoding parameter.

Optionally, that the decoding parameter training unit optimizes the decoding parameter based on a loss quantity of the current round that is determined by the predicted quantities and label quantities of the bs targets in the current round includes determining a loss quantity of each target based on the predicted quantity and a label quantity of each target in the current round, obtaining the loss quantity of the current round based on the loss quantities of the bs targets in the current round, and optimizing the decoding parameter based on a gradient of the loss quantity of the current round for the decoding parameter.

Optionally, the predetermined training termination condition includes the following: the encoding parameter is optimized R times, where R is a natural number greater than 1.

In an implementation, the graph data of the instances includes at least one of self node data of the instances and data of a relationship with another instance; and the corresponding non-graph data includes at least one of self non-node data of the instances corresponding to the targets and time sequence data related to the instances corresponding to the targets.

In the preceding implementation, the self node data of the instances includes self dense data of the instances; and the self non-node data of the instances includes self sparse data of the instances.

Optionally, the hybrid graph neural network model is used to evaluate a category of a user; the instance is a user; the training target is a category of a user; the graph data of the instance includes a part, of user data, that is expressed as attributes of nodes and edges in the graph; and the corresponding non-graph data includes at least one of the following: a remaining part, of the user data, other than the part that is expressed as the attributes of nodes and edges in the graph, and historical behavior time sequence data generated based on historical behavior records of the user; and the apparatus further includes a category prediction and service processing unit, configured to predict a category of a user by using a hybrid graph neural network model obtained after training, and perform, based on the category of the user, service processing corresponding to the category for the user.

Optionally, the hybrid graph neural network model is used to evaluate a degree of matching between a user and an object; the instance is an object; the training target is a degree of matching between a user and a to-be-recommended object; the graph data of the instance includes a part, of object data, that is expressed as attributes of nodes and edges in the graph; the graph representation vector of the instance corresponding to the target includes a graph representation vector of the to-be-recommended object and graph representation vectors of N objects on which the user had performed a historical behavior; the corresponding non-graph data includes a representation vector of the user; and N is a natural number; and the apparatus further includes a match prediction and recommendation unit, configured to predict a degree of matching between a user and a to-be-recommended object by using a hybrid graph neural network model obtained after training, and recommend, to the user, several to-be-recommended objects with higher degrees of matching with the user.

Figure 7:
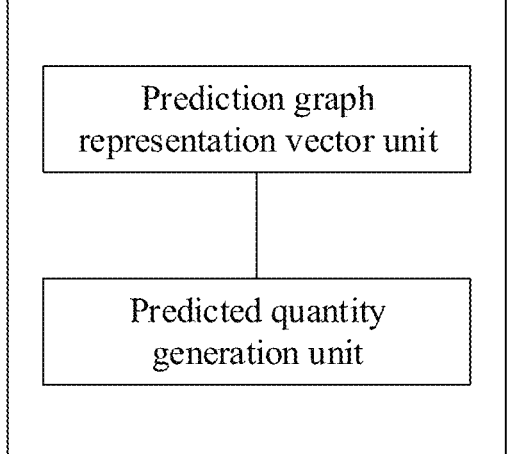
FIG. 7 is a logical structural diagram of a prediction apparatus of a hybrid graph neural network model, according to some embodiments of this specification.

FIG. 7 shows a prediction apparatus of a hybrid graph neural network model. The hybrid graph neural network model includes an encoding function and a decoding function. The encoding function is a graph neural network algorithm with an encoding parameter obtained after training by using the previously described training method of a hybrid graph neural network model. The decoding function is a machine learning algorithm with a decoding parameter obtained after training by using the previously described training method of a hybrid graph neural network model. The apparatus includes a prediction graph representation vector unit and a predicted quantity generation unit. The prediction graph representation vector unit is configured to generate, by using instances corresponding to all to-be-predicted targets and several nearest neighbors of the instances as nodes in a graph, a graph representation vector of each instance by using the encoding function based on graph data of all the instances. The predicted quantity generation unit is configured to generate predicted quantities of the targets by using the decoding function based on the graph representation vectors of the instances corresponding to the to-be-predicted targets and non-graph data corresponding to the to-be-predicted targets.

Optionally, the apparatus further includes a target extraction unit, configured to extract ps to-be-predicted targets from a set of to-be-predicted targets, where ps is a natural number; the predicted quantity generation unit is specifically configured to generate a predicted quantity of each of the ps targets by using the decoding function based on the graph representation vector of the instance corresponding to each target and non-graph data corresponding to each target; and the apparatus further includes a repetition control unit, configured to delete the ps targets from the set of to-be-predicted targets; and if the set of to-be-predicted targets is not empty, continue with a next round of extracting a maximum ofps targets for prediction, until the target set is empty.

In an example, the graph data of the instances includes at least one of self node data of the instances and data of a relationship with another instance; and the corresponding non-graph data includes at least one of self non-node data of the instances corresponding to the targets and time sequence data related to the instances corresponding to the targets.

In the preceding example, the self node data of the instances includes self dense data of the instances; and the self non-node data of the instances includes self sparse data of the instances.

Optionally, the hybrid graph neural network model is used to evaluate a category of a user; the instance is a user; the to-be-predicted target is a category of a user; the graph data of the instance includes a part, of user data, that is expressed as attributes of nodes and edges in the graph; and the corresponding non-graph data includes at least one of the following: a remaining part, of the user data, other than the part that is expressed as the attributes of nodes and edges in the graph, and historical behavior time sequence data generated based on historical behavior records of the user; and the apparatus further includes a category service processing unit, configured to perform, based on a predicted category of a user, service processing corresponding to the category for the user.

Optionally, the hybrid graph neural network model is used to evaluate a degree of matching between a user and an object; the instance is an object; the training target is a degree of matching between a user and a to-be-recommended object; the graph data of the instance includes a part, of object data, that is expressed as attributes of nodes and edges in the graph; the graph representation vector of the instance corresponding to the target includes a graph representation vector of the to-be-recommended object and graph representation vectors of N objects on which the user had performed a historical behavior; the corresponding non-graph data includes a representation vector of the user; and N is a natural number; and the apparatus further includes a recommendation unit, configured to recommend, to a user based on a degree of matching between a to-be-recommended object and the user, several to-be-recommended objects with higher degrees of matching with the user.

Some embodiments of this specification provide a computer device. The computer device includes a memory and a processor. The memory stores a computer program that can be run by the processor. When running the stored computer program, the processor performs the steps of the training method of a hybrid graph neural network in the embodiments of this specification. For a detailed description of the steps of the training method of a hybrid graph neural network, refer to the preceding content. Details are omitted here for simplicity.

Some embodiments of this specification provide a computer device. The computer device includes a memory and a processor. The memory stores a computer program that can be run by the processor. When running the stored computer program, the processor performs the steps of the prediction method of a hybrid graph neural network in the embodiments of this specification. For a detailed description of the steps of the prediction method of a hybrid graph neural network, refer to the preceding content. Details are omitted here for simplicity.

Some embodiments of this specification provide a computer-readable storage medium. The storage medium stores a computer program. When the computer program is run by a processor, the steps of the training method of a hybrid graph neural network in the embodiments of this specification are performed. For a detailed description of the steps of the training method of a hybrid graph neural network, refer to the preceding content. Details are omitted here for simplicity.

Some embodiments of this specification provide a computer-readable storage medium. The storage medium stores a computer program. When the computer program is run by a processor, the steps of the prediction method of a hybrid graph neural network in the embodiments of this specification are performed. For a detailed description of the steps of the prediction method of a hybrid graph neural network, refer to the preceding content. Details are omitted here for simplicity.

The preceding descriptions are merely example embodiments of this specification, and are not intended to limit other claimed embodiments. Any modification, equivalent replacement, or improvement made in the spirit and principle of this specification shall fall within the claimed protection scope.

In a typical configuration, a computing device includes one or more central processing units (CPUs), an input/output interface, a network interface, and a memory.

The memory may include a non-persistent memory, a random access memory (RAM), and/or a non-volatile memory in a computer-readable medium, for example, a read-only memory (ROM) or a flash read-only memory (flash RAM). The memory is an example of the computer-readable medium.

The computer-readable medium includes persistent, non-persistent, movable, and unmovable media that can store information by using any method or technology. The information can be computer-readable instructions, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in this specification, the computer-readable medium does not include computer-readable transitory media (transitory media) such as a modulated data signal and a carrier.

It should be further noted that, the terms "include", "comprise", or their any other variants are intended to cover a non-exclusive inclusion, so a process, a method, a product, or a device that includes a list of elements not only includes those elements but also includes other elements which are not expressly listed, or further includes elements inherent to such a process, method, product, or device. Without more constraints, an element preceded by "includes a . . . " does not preclude the existence of additional identical elements in the process, method, product, or device that includes the element.

A person skilled in the art should understand that the embodiments of this specification can be provided as a method, a system, or a computer program product. Therefore, the embodiments of this specification can use a form of hardware only embodiments, software only embodiments, or embodiments with a combination of software and hardware. Moreover, the embodiments of this specification can use a form of a computer program product that is implemented on one or more computer-usable storage media (including but not limited to a disk memory, a CD-ROM, and an optical memory) that include computer-usable program code.

What is claimed is:

1. A method of a hybrid graph neural network model, wherein the hybrid graph neural network model comprises an encoding function and a decoding function, the encoding function is a graph neural network algorithm with an encoding parameter, the decoding function is a machine learning algorithm with a decoding parameter, and the method comprises the following:

generating, by using instances corresponding to all targets in training samples and several nearest neighbors of the instances as nodes in a graph, a graph representation vector of each instance by using the encoding function based on graph data of all the instances;

performing t rounds of training on the decoding parameter; and in each round, extracting bs targets from the training samples, generating a predicted quantity of each target by using the decoding function based on the graph representation vector of the instance corresponding to each target and non-graph data corresponding to each target, and optimizing the decoding parameter based on a loss quantity of a current round that is determined by the predicted quantities and label quantities of the bs targets in the current round, wherein bs is a natural number, and t is a natural number greater than 1;

optimizing the encoding parameter based on loss quantities of the t rounds by calculating gradients of the loss quantity of each round for the graph representation vectors of the instances corresponding to the bs targets in the current round, and optimizing the encoding parameter based on bs×t gradients by accumulating gradients of the t rounds separately on the graph representation vectors of the instances corresponding to the bs targets in each round, determining gradients of loss quantities for the encoding parameter based on the accumulated gradients on the graph representation vectors, and optimizing the encoding parameter by using the gradients of the loss quantities for the encoding parameter; and repeating all the preceding steps until a predetermined training termination condition is satisfied.

2. The method according to claim 1, wherein the optimizing the decoding parameter based on a loss quantity of the current round that is determined by the predicted quantities and label quantities of the bs targets in the current round comprises determining a loss quantity of each target based on the predicted quantity and a label quantity of each target in the current round, obtaining the loss quantity of the current round based on the loss quantities of the bs targets in the current round, and optimizing the decoding parameter based on a gradient of the loss quantity of the current round for the decoding parameter.

3. The method according to claim 1, wherein the predetermined training termination condition comprises the following: the encoding parameter is optimized R times, wherein R is a natural number greater than 1.

4. The method according to claim 1, wherein the graph data of the instances comprises at least one of self node data of the instances and data of a relationship with another instance; and the corresponding non-graph data comprises at least one of self non-node data of the instances corresponding to the targets and time sequence data related to the instances corresponding to the targets.

5. The method according to claim 4, wherein the self node data of the instances comprises self dense data of the instances; and the self non-node data of the instances comprises self sparse data of the instances.

6. The method according to claim 1, wherein the hybrid graph neural network model is used to evaluate a category of a user; the instance is a user; the training target is a category of a user; the graph data of the instance comprises a part, of user data, that is expressed as attributes of nodes and edges in the graph; and the corresponding non-graph data comprises at least one of the following: a remaining part, of the user data, other than the part that is expressed as the attributes of nodes and edges in the graph, and historical behavior time sequence data generated based on historical behavior records of the user; and the method further comprises predicting a category of a user by using a hybrid graph neural network model obtained after training, and performing, based on the category of the user, service processing corresponding to the category for the user.

7. The method according to claim 1, wherein the hybrid graph neural network model is used to evaluate a degree of matching between a user and an object; the instance is an object; the training target is a degree of matching between a user and a to-be-recommended object; the graph data of the instance comprises a part, of object data, that is expressed as attributes of nodes and edges in the graph; the graph representation vector of the instance corresponding to the target comprises a graph representation vector of the to-be-recommended object and graph representation vectors of N objects on which the user had performed a historical behavior; the corresponding non-graph data comprises a representation vector of the user; and N is a natural number; and the method further comprises predicting a degree of matching between a user and a to-be-recommended object by using a hybrid graph neural network model obtained after training, and recommending, to the user, several to-be-recommended objects with higher degrees of matching with the user.

8. The method according to claim 1, wherein the encoding parameter is obtained after the training, and wherein the decoding parameter is obtained after the training, and the method further comprises the following:

generating, by using instances corresponding to all to-be-predicted targets and several nearest neighbors of the instances as nodes in a graph, a graph representation vector of each instance by using the encoding function based on graph data of all the instances; and generating predicted quantities of the targets by using the decoding function based on the graph representation vectors of the instances corresponding to the to-be-predicted targets and non-graph data corresponding to the to-be-predicted targets.

9. The method according to claim 8, wherein the method further comprises extracting ps to-be-predicted targets from a set of to-be-predicted targets, wherein ps is a natural number;

the generating predicted quantities of the targets by using the decoding function based on the graph representation vectors of the instances corresponding to the to-be-predicted targets and non-graph data corresponding to the to-be-predicted targets comprises generating a predicted quantity of each of the ps targets by using the decoding function based on the graph representation vector of the instance corresponding to each target and non-graph data corresponding to each target; and the method further comprises deleting the ps targets from the set of to-be-predicted targets; and if the set of to-be-predicted targets is not empty, continuing with a next round of extracting a maximum of ps targets for prediction, until the target set is empty.

10. The method according to claim 8, wherein the graph data of the instances comprises at least one of self node data of the instances and data of a relationship with another instance; and the corresponding non-graph data comprises at least one of self non-node data of the instances corresponding to the targets and time sequence data related to the instances corresponding to the targets.

11. The method according to claim 10, wherein the self node data of the instances comprises self dense data of the instances; and the self non-node data of the instances comprises self sparse data of the instances.

12. The method according to claim 8, wherein the hybrid graph neural network model is used to evaluate a category of a user; the instance is a user; the to-be-predicted target is a category of a user; the graph data of the instance comprises a part, of user data, that is expressed as attributes of nodes and edges in the graph; and the corresponding non-graph data comprises at least one of the following: a remaining part, of the user data, other than the part that is expressed as the attributes of nodes and edges in the graph, and historical behavior time sequence data generated based on historical behavior records of the user; and the method further comprises performing, based on a predicted category of a user, service processing corresponding to the category for the user.

13. The method according to claim 8, wherein the hybrid graph neural network model is used to evaluate a degree of matching between a user and an object; the instance is an object; the training target is a degree of matching between a user and a to-be-recommended object; the graph data of the instance comprises a part, of object data, that is expressed as attributes of nodes and edges in the graph; the graph representation vector of the instance corresponding to the target comprises a graph representation vector of the to-be-recommended object and graph representation vectors of N objects on which the user had performed a historical behavior; the corresponding non-graph data comprises a representation vector of the user; and Nis a natural number; and the method further comprises recommending, to a user based on a degree of matching between a to-be-recommended object and the user, several to-be-recommended objects with higher degrees of matching with the user.

14. A computing device for executing a hybrid graph neural network model, wherein the hybrid graph neural network model comprises an encoding function and a decoding function, the encoding function is a graph neural network algorithm with an encoding parameter, the decoding function is a machine learning algorithm with a decoding parameter, the computing device comprising a memory and a processor, wherein the memory stores executable instructions that, in response to execution by the processor, cause the computing device to:

generate, by using instances corresponding to all targets in training samples and several nearest neighbors of the instances as nodes in a graph, a graph representation vector of each instance by using the encoding function based on graph data of all the instances;

perform t rounds of training on the decoding parameter; and in each round, extracting bs targets from training samples, generating a predicted quantity of each target by using the decoding function based on the graph representation vector of the instance corresponding to each target and non-graph data corresponding to each target, and optimizing the decoding parameter based on a loss quantity of a current round that is determined by the predicted quantities and label quantities of the bs targets in the current round, wherein bs is a natural number, and tis a natural number greater than 1;

optimize the encoding parameter based on loss quantities of the t rounds by calculating gradients of the loss quantity of each round for the graph representation vectors of the instances corresponding to the bs targets in the current round, and optimizing the encoding parameter based on bs×t gradients by accumulating gradients of the t rounds separately on the graph representation vectors of the instances corresponding to the bs targets in each round, determining gradients of loss quantities for the encoding parameter based on the accumulated gradients on the graph representation vectors, and optimizing the encoding parameter by using the gradients of the loss quantities for the encoding parameter; and repeat all the preceding steps until a predetermined training termination condition is satisfied.

15. A non-transitory computer-readable storage medium for a hybrid graph neural network model, wherein the hybrid graph neural network model comprises an encoding function and a decoding function, the encoding function is a graph neural network algorithm with an encoding parameter, the decoding function is a machine learning algorithm with a decoding parameter, the non-transitory computer-readable storage medium having stored therein instructions that, in response to execution by a processor of a device, cause the device to:

generate, by using instances corresponding to all targets in training samples and several nearest neighbors of the instances as nodes in a graph, a graph representation vector of each instance by using the encoding function based on graph data of all the instances;

perform t rounds of training on the decoding parameter; and in each round, extracting bs targets from training samples, generating a predicted quantity of each target by using the decoding function based on the graph representation vector of the instance corresponding to each target and non-graph data corresponding to each target, and optimizing the decoding parameter based on a loss quantity of a current round that is determined by the predicted quantities and label quantities of the bs targets in the current round, wherein bs is a natural number, and t is a natural number greater than 1;

optimize the encoding parameter based on loss quantities of the t rounds by calculating gradients of the loss quantity of each round for the graph representation vectors of the instances corresponding to the bs targets in the current round, and optimizing the encoding parameter based on bs×t gradients by accumulating gradients of the t rounds separately on the graph representation vectors of the instances corresponding to the bs targets in each round, determining gradients of loss quantities for the encoding parameter based on the accumulated gradients on the graph representation vectors, and optimizing the encoding parameter by using the gradients of the loss quantities for the encoding parameter; and repeat all the preceding steps until a predetermined training termination condition is satisfied.

* * * * *